Patented Oct. 15, 1940

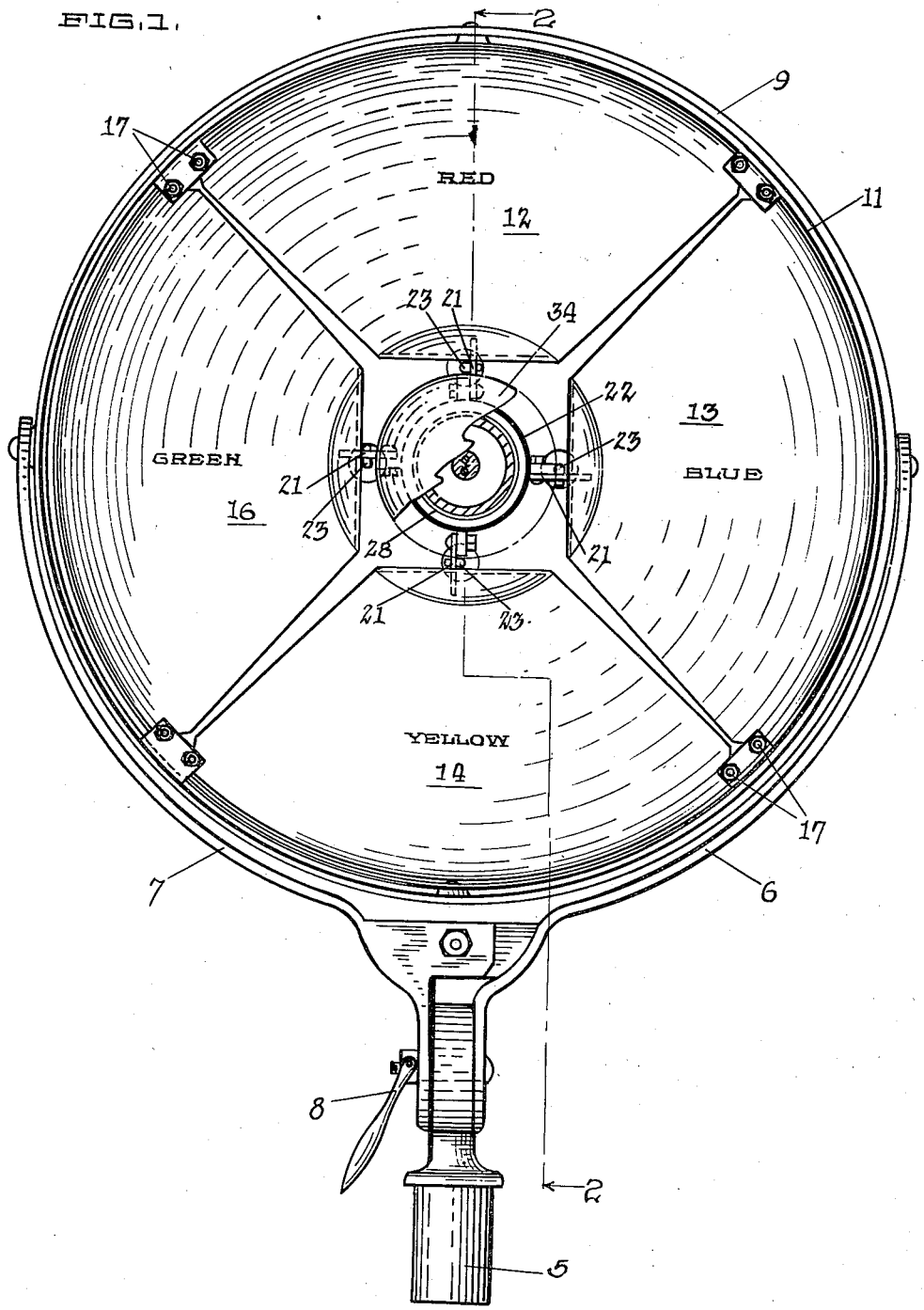

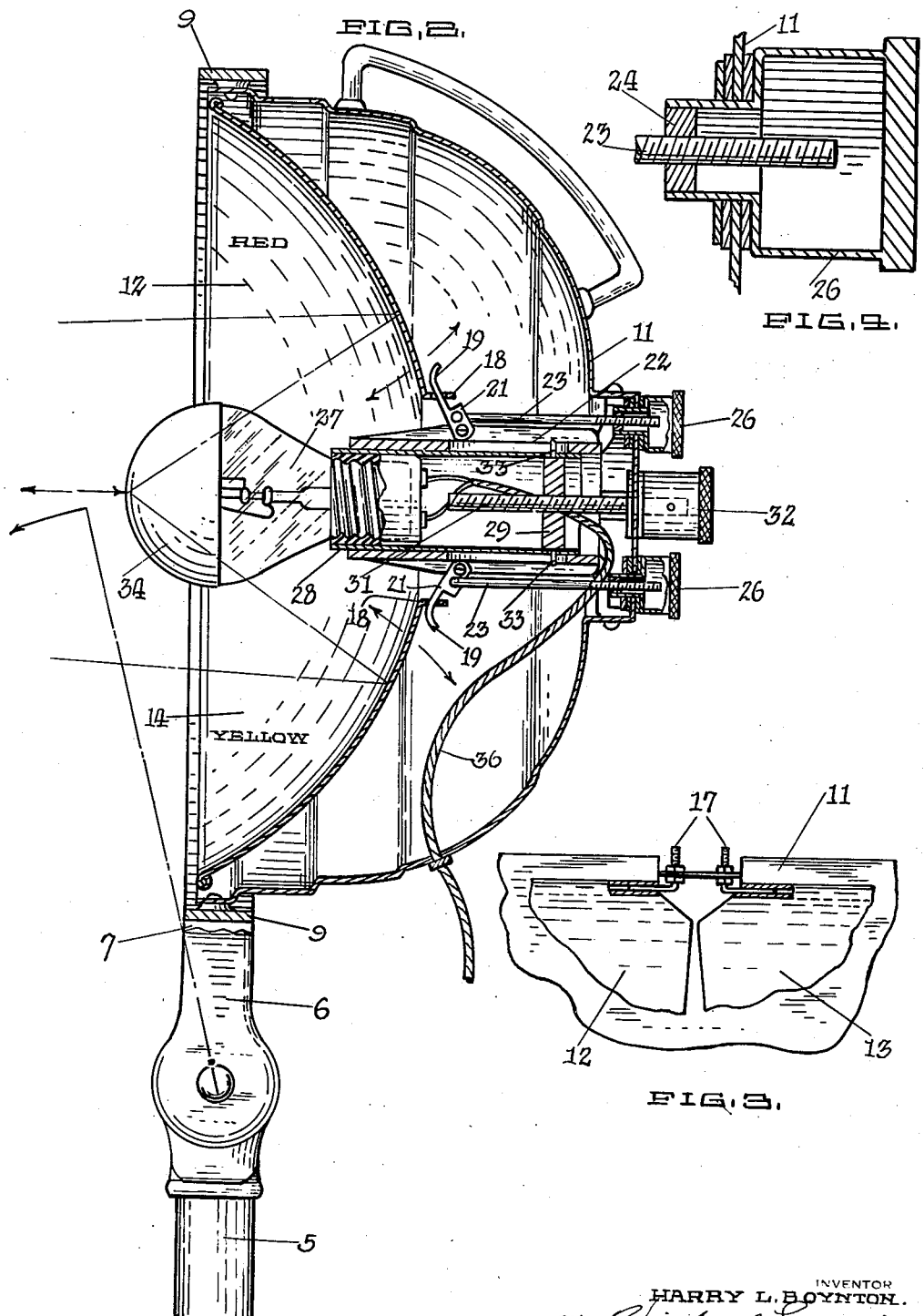

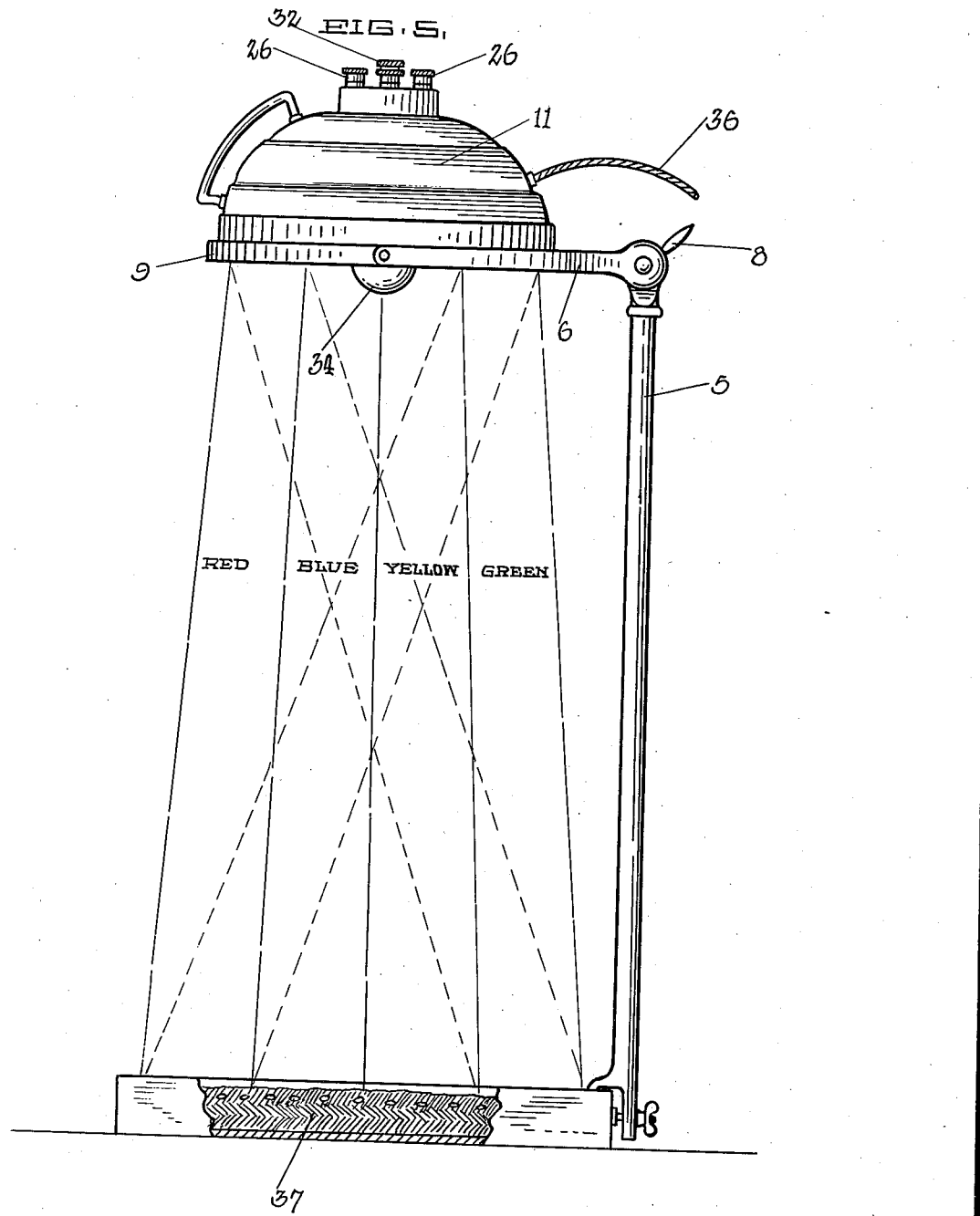

2,217,790

UNITED STATES PATENT OFFICE 2,217,790

COLOR PROJECTOR

Harry L. Boynton, Hollywood, Calif., assignor of one-half to Harold Devenish Smith, Hollywood, Calif.

Application March 8, 1938, Serial No. 194,701

5 Claims. (Cl. 240—3.1)

This invention relates to a color projector, and has particular reference to a device containing a segmented reflector. Each segment of the reflector producing a different color and so arranged as to be operative by means of mechanical adjustments for opening and closing the segments in a manner that breaks a concentrated beam into a number of individual beams. Through this operation the operator may concentrate all of the color beams into one blended color beam, or may through the means of adjustment, segregate the individual colors, or may change the position of the colors into various scopes desired.

The object of this procedure allows this invention to be adapted for various uses. In this application I particularly refer the use of the device to that of a seed germinator. Through practical experiments made by the inventor, he has discovered that in applying these color beams to a bed of seed, that germination takes place very much faster than under the most favorable natural conditions, and eliminates the use of applied heats to the soil, or the use of a hot house. The beams from the various colored segments having decidedly different effects upon the germinating process, it has been discovered that by moving the various colors into different positions over the seed bed and at intervals reversing the positions of the colors, a rapid germination takes place and a very sturdy production is created.

Other objects and advantages will be apparent during the course of the following description.

In the accompanying drawings forming a part of this specification and in which like numerals are employed to designate like parts throughout the same:

Fig. 1 is a front elevation of my device;

Fig. 2 is a vertical cross section taken on the line 2—2 of Fig. 1;

Fig. 3 is a fragmentary detailed view, showing the manner of mounting each segment of the reflector;

Fig. 4 is an enlarged fragmentary cross sectional view of one of the adjusting knobs; and Fig. 5 is a side elevation of my device in use in connection with a seed germinating bed.

It is a well known fact that light consists of wave lengths which produce various colors, and it is also a well known fact that light in various forms has a pronounced effect upon the germination and growth of vegetation.

Applicant has invented a device wherein it is possible to create rays of various colors, which may be mixed in varying proportions, and may be spread or concentrated, so that the user may accomplish almost any desired result within the possibilities of the device.

In the accompanying drawings wherein for the purpose of illustration is shown a preferred embodiment of my invention, in Fig. 1 I have shown a standard 5 having arms 6 and 7 which are pivoted thereto and held by an adjusting handle 8. A ring 9 is pivoted to the arms 6 and 7 and has a casing 11 attached thereto. This casing 11 serves to support the reflectors and adjusting mechanism, as well as the illuminant and its adjusting mechanism. As all of the segments of the reflectors are mounted and adjusted in the same manner, but one section will be described.

Viewing Fig. 1 it will be noted that there are four reflector segments 12, 13, 14, and 16, corresponding to red, blue, yellow, and green respectively. These segments are attached to the casing 11, as best illustrated in Fig. 3, where it will be noted that pivots 17 connect the casing to the corner of each segment. Secured to the back of each segment shown in Fig. 2, is a lug 18 which has an opening therethrough and is engaged by the hook section 19 of a pivoted member 21, pivoted to the tubular member 22, which tubular member is in turn secured to the casing 11. An adjusting rod 23 extends through a nut 24, as best shown in Fig. 4, carried by the knob 26 and rotatably supported in the casing 11.

The result of this construction is that when the knob 26 is rotated, the rod 23 travels through the stationary nut 24 moving the pivot back and forth, causing the hook section 19 to open or close the segment of the reflector.

The illuminant 27 is carried in a slider 28 and has a nut 29 engaging the thread of a rod 31 which may be rotated by a knob 32. The nut 29 has pins 33 which prevent rotation of the slider 28. The illuminant is provided with an opaque cap 34, which prevents any direct rays of illumination from reaching the surface being illuminated. A cable 36 conducts current to the illuminant.

The device is particularly suitable for the germinating of seeds. In Fig. 5 I have shown a seed bed 37, to which the standard 5 is attached, and the casing is swung to a position so that the rays of color will pass downwardly onto said bed. In this view it will also be noted how the rays of various colors may be adjusted to reflect light in direct formation or be reversed, and it is obvious that as the various segments of the reflector are individually adjusted, the positioning of the same may be easily controlled.

It is to be understood that the form of my invention herewith shown and described is to be taken as a preferred example of the same and that various changes relative to the material, number of segments, size, shape and arrangement of parts may be resorted to without departing from the spirit of the invention or the scope of the subjoined claims.

Having thus described my invention, I claim:

1. A color projector comprising a segmental reflector having an adjustable illuminant associated therewith, each segment being of a different color, means for moving each segment and said illuminant in such a manner as to permit a condensation of all the colors into one blended color ray, and screw actuated adjustments associated with said segments to position them to project a number of rays, each segment being capable of projecting an individual distinct color ray.

2. A color projector embodying a casing, a concave reflector arranged therein and formed of a series of segmental sections, each section a different color and pivoted at its outer circumferential edge, and an illuminant at the center of said sections, means for adjusting said illuminant, and means for individually moving said sections on their pivots, whereby each section may project a beam at a different point or all beams may be focused at one point.

3. A color projector embodying a casing, a concave reflector arranged therein and formed of a series of segmental sections, each section pivoted at its outer circumferential edge and of a different color, an illuminant at the center of said sections, and means for individually moving said sections on their pivots, whereby each section may project its color beam at a different point or all of the color beams may be focused at one point.

4. A color projector embodying a casing, a concave reflector arranged therein and formed of a series of segmental sections of different colors, each section pivoted at its outer circumferential edge, an adjustable illuminant at the center of said sections, and means for individually moving said sections on their pivots, whereby each section may project its color beam at a different point or all of the color beams may be focused at one point.

5. A color projector embodying a casing, a concave reflector arranged therein and formed of a series of segmental sections of different colors, each section pivoted at its outer circumferential edge, an adjustable illuminant at the center of said sections, a cap carried by the outer end of the illuminant to prevent direct outward rays, means for individually moving said sections on their pivots and a separable means for moving the illuminant, whereby each section may project its color beam at a different point or all of the color beams may be focused at one point.

HARRY L. BOYNTON.